(12) United States Patent
Didcock et al.

(10) Patent No.: US 7,272,214 B2
(45) Date of Patent: Sep. 18, 2007

(54) FLEXIBLE DISTRIBUTED/CENTRALIZED ARCHITECTURE FOR VOICE/UNIFIED MESSAGING SYSTEM

(75) Inventors: Clifford Neil Didcock, Wantage (GB); Michael Geoffrey Andrew Wilson, London (GB)

(73) Assignee: Avaya UK, Guildford, Surrey (GB)

( * ) Notice: Subject to any disclaimer, the term of this patent is extended or adjusted under 35 U.S.C. 154(b) by 413 days.

(21) Appl. No.: 10/657,546

(22) Filed: Sep. 8, 2003

(65) Prior Publication Data
US 2004/0120480 A1 Jun. 24, 2004

(30) Foreign Application Priority Data
Dec. 24, 2002 (GB) ............................ 0230197.6
Mar. 31, 2003 (EP) ............................ 03252030

(51) Int. Cl.
*H04M 1/64* (2006.01)
(52) U.S. Cl. .................... 379/88.25; 379/88.17; 707/4
(58) Field of Classification Search ............ 379/67, 379/88, 89, 71, 76, 88.1, 88.17, 88.22, 88.25; 707/4
See application file for complete search history.

(56) References Cited
U.S. PATENT DOCUMENTS

| | | | | |
|---|---|---|---|---|
| 5,619,554 A | * | 4/1997 | Hogan et al. ............ | 379/88.1 |
| 5,781,615 A | | 7/1998 | Bales et al. | |
| 6,285,745 B1 | * | 9/2001 | Bartholomew et al. .. | 379/88.17 |
| 6,411,684 B1 | | 6/2002 | Cohn et al. | |
| 6,735,297 B1 | | 5/2004 | McCormack et al. | |
| 6,909,708 B1 | | 6/2005 | Krishnaswamy et al. | |
| 7,085,758 B2 | * | 8/2006 | Barsness et al. ............ | 707/4 |
| 2001/0011303 A1 | | 8/2001 | Chang et al. | |

FOREIGN PATENT DOCUMENTS

| | | |
|---|---|---|
| EP | 0 567 294 A2 | 10/1993 |
| EP | 0 841 796 A2 | 5/1998 |
| EP | 0 843 453 A2 | 5/1998 |
| EP | 0 913 982 A2 | 5/1999 |
| EP | 1 109 391 A2 | 6/2001 |
| WO | WO99/21344 | 4/1999 |

\* cited by examiner

*Primary Examiner*—Gerald Gauthier
(74) *Attorney, Agent, or Firm*—Ryan, Mason & Lewis, LLP

(57) ABSTRACT

There is provided a messaging system comprising at least one distributed front-end messaging system and a centralized data store associated with said at least one distributed front-end messaging system, in which system the centralized data store includes means for storing data associated with users of the at least one distributed front-end messaging system, the at least one distributed front-end messaging system further including a respective at least one cache means for storing at least a portion of the centralized data associated with users of said at least one distributed front-end messaging system such that at least one messaging function can be provided to users of said at least one distributed front-end messaging system in dependence on the data stored in said cache means. A centralized messaging system provides access to all stored data associated for all users associated with at least one distributed front-end messaging system.

18 Claims, 4 Drawing Sheets

Distributed offices
with local VM/UM systems

Distributed offices
without local VM/UM

Centralized data facility

Long distance
(telephony) connections

FLEXIBLE DISTRIBUTED/CENTRALIZED ARCHITECTURE FOR VOICE/UNIFIED MESSAGING SYSTEM

FIELD OF THE INVENTION

The present invention relates to the field of messaging systems, and particularly to voice messaging and unified messaging systems.

BACKGROUND TO THE INVENTION

Messaging systems are well-known in the art. One of the simplest form of messaging system is a voice messaging system. Computer Telephony Integration (CTI) is a term which refers to the integration of computer architectures with telephony systems. A voice messaging system is an example of a CTI system, and a further example is a unified messaging system.

Voice or unified messaging systems have conventionally been deployed in one of three implementations.

In a first voice messaging implementation a voice messaging (or unified messaging) system is co-located with a subscriber's telephone switch, i.e. a subscriber's private branch exchange (PBX). Within a multi-site organization or enterprise this will tend to result in each physical location (which has its own telephone switch) having a separate voice messaging (or unified messaging) system. For an enterprise with many distributed locations, such an arrangement requires the deployment of many (possibly small) systems resulting in considerable IT administrative costs.

FIG. 1 shows two distributed locations each with their own telephone switch, specifically a PBX 102 and 106 respectively, and respective dedicated unified or voice messaging systems 104 and 108. This system provides, at least, the following three typical voice messaging functions: call answering, automated attendant and subscriber access.

1. The call answering feature is initiated when calls are forwarded by the telephone system as a result of the called party not answering (e.g. due to a busy or no-answer condition).
2. The automated attendant feature offers callers a menu for automatically routing a call to the desired answering point, without the need for operator intervention.
3. The subscriber access feature allows subscribers, or mailbox owners, of the voice messaging system to call into the system and retrieve their messages over the phone.

In a second voice messaging implementation, the voice messaging system utilizes a deployment of a central messaging system serving multiple remote locations. This form of deployment requires long-distance telephone connections to be provided between the remote private branch exchanges (PBXs), serving remote locations, and the centralized messaging system.

FIG. 2 shows two locations each having a respective PBX 202 and 204 being served by a single centralized unified or voice messaging system 206 associated with a single centralized PBX 208. The long distance telephone connections generally need to be provided regardless of their use (i.e. it is necessary to purchase enough capacity to handle busy periods). In addition some voice messaging features are lost in the centralized arrangement of FIG. 2. The automated attendant application provides callers into an office or building with the ability to connect to a user. This capability is not provided in the centralized arrangement of FIG. 2: the system providing the automated attendant function handles all users for all systems, and so does not provide service equivalent to a human attendant at the remote site. Additionally, different offices may be located in different countries with different language requirements. A simple example is that a first office may be in Canada and need both English and French languages, whereas another office served from the same centralized facility may have entirely, non-overlapping, language requirements, for example located in Mexico and requiring Spanish. A common and unique numbering plan across all mailboxes across all sites is also needed.

In a third implementation the second implementation is modified such that the long-distance telephone connectivity is provided by an organisation's (existing) data (IP) Wide Area network (WAN), possibly using Voice over Internet Protocol (VoIP). This deployment puts a strict requirement on the bandwidth and more critically the quality of service (e.g. the network latency) characteristics of the corporation's WAN. This most generally is not, and will not, be met for the majority of corporations now or in the near future.

It is an aim of the present invention to provide an improved messaging system. A further aim is to provide such a system offering increased deployment flexibility.

SUMMARY OF THE INVENTION

In a first aspect the present invention provides a messaging system comprising at least one distributed front-end messaging system and a centralized data store associated with said at least one distributed front-end messaging system, in which system the centralized data store includes means for storing data associated with users of the at least one distributed front-end messaging system, the at least one distributed front-end messaging system further including a respective at least one cache means for storing at least a portion of the centralized data associated with users of said at least one distributed front-end messaging system such that at least one messaging function can be provided to users of said at least one distributed front-end messaging system in dependence on the data stored in said cache means. The messaging system is preferably a voice messaging system or unified messaging system.

There may be provided a plurality of distributed front-end messaging systems each associated with a respective plurality of users and each including a cache means, wherein the centralized data store is adapted to store data associated with all users of said front-end messaging systems.

There may be further provided a centralized front-end messaging system associated with said centralized data store. The centralized front-end messaging system may be associated with a plurality of users, data associated with said users being stored in the centralized data store.

The centralized front-end messaging system may provide at least one messaging function for users of said at least one distributed front-end messaging system. The centralized front-end messaging system may be adapted to identify the front-end messaging system of a user. The centralized messaging system may be adapted to identify the front-end messaging system of a user in dependence on a called number, a calling number, or a unique user identifier.

The centralized messaging system may provide access to all stored data associated with said at least one distributed front-end messaging system associated with the user.

The centralized data store may store configuration data and message data associated with all users.

The at least one voice messaging function may include call answering. Said at least one messaging function may be a subscriber access function.

Each front-end messaging system may be associated with a respective Voice Mail Domain. Each front-end messaging system may be associated with a telecommunications switch.

In a further aspect the present invention provides a method of configuring a messaging system comprising: storing, at a centralized location, data associated with all users of the messaging system; storing, at least one distributed location, at least part of said data associated with users at the at least one distributed location, and providing at least one messaging function to users at the at least one distributed front-end messaging system in dependence on the data stored at the distributed location.

The step of storing the data at said at least one distributed location may comprise the step of caching the data at the centralized location. The method may further comprise step of providing at least one messaging function to users at the at least one distributed front-end messaging system in dependence on data stored at the centralized locations. The method may further comprise the step of accessing the centralized location directly.

In further aspects, the present invention also provides a messaging system comprising a plurality of remote servers and a centralized data store associated with said plurality of remote servers, in which system the centralized data store includes means for storing messages and data associated with all users of the plurality of remote servers, and the plurality of remote servers are each associated with a respective cache means for storing at least a portion of the data associated with users of said remote server such that at least one voice messaging function can be provided to users of said voice server independent of the centralized message store. The messaging system is preferably a unified messaging or voice messaging system.

The at least one voice messaging function may include call answering.

The plurality of voice servers may be associated with a plurality of Voice Mail Domains. The number of voice servers may correspond to the number of Voice Mail Domains. Each voice server may be associated with a telecommunications switch. The telecommunications switch may be a public branch exchange.

The centralized data store may further be provided with a collection of front end servers or a single server, said interface being connected to a dedicated telecommunications switch, such a private branch exchange. Such switch may provide subscriber access to the centralized data store.

The centralized data store may provide a common message store for all voice mail domains and a common directory store for all voice mail domains.

There may be provided for subscriber access to the centralized data store via said interface.

In accordance with embodiments of the invention the messaging function is architecturally split into a number of separate components which, critically, can be implemented in at least two separate computer systems. These systems can be deployed:

i. In separate physical locations connected using a data network. The message storage can be centralized within a single (or few) data storage facilities, providing security, simplicity and management costs benefits.

ii. These systems provide the beneficial external user characteristics normally derived from multiple distributed systems (e.g. a local automated attendant is provided, specific language support etc).

iii. In addition these systems may be engineered to provide reliable voice/unified messaging support without strict requirements on data network availability and quality of service (QoS).

Such an architecture allows much more flexibility of deployment for voice messaging or unified messaging systems.

There are considerable cost savings to be realized within enterprises by centralizing the storage of corporate data. Messages within e-mail or voice-mail systems derive similar benefits from a centralized storage policy. A geographically distributed Unified or Voice Messaging architecture provides a mechanism to deploy part of the Unified or Voice messaging function co-located with a subscribers telephone switch while also allowing for a centralized message storage facility.

BRIEF DESCRIPTION OF THE DRAWINGS

The invention is now described by way of example with reference to the accompanying figures, in which.

DESCRIPTION OF THE PREFERRED EMBODIMENTS

The present invention is described herein by way of reference to a particular example, and in particular to the example of a unified/voice messaging system. However the invention is not limited in its applicability to the specifics of the examples and embodiments described herein.

Figure 3:
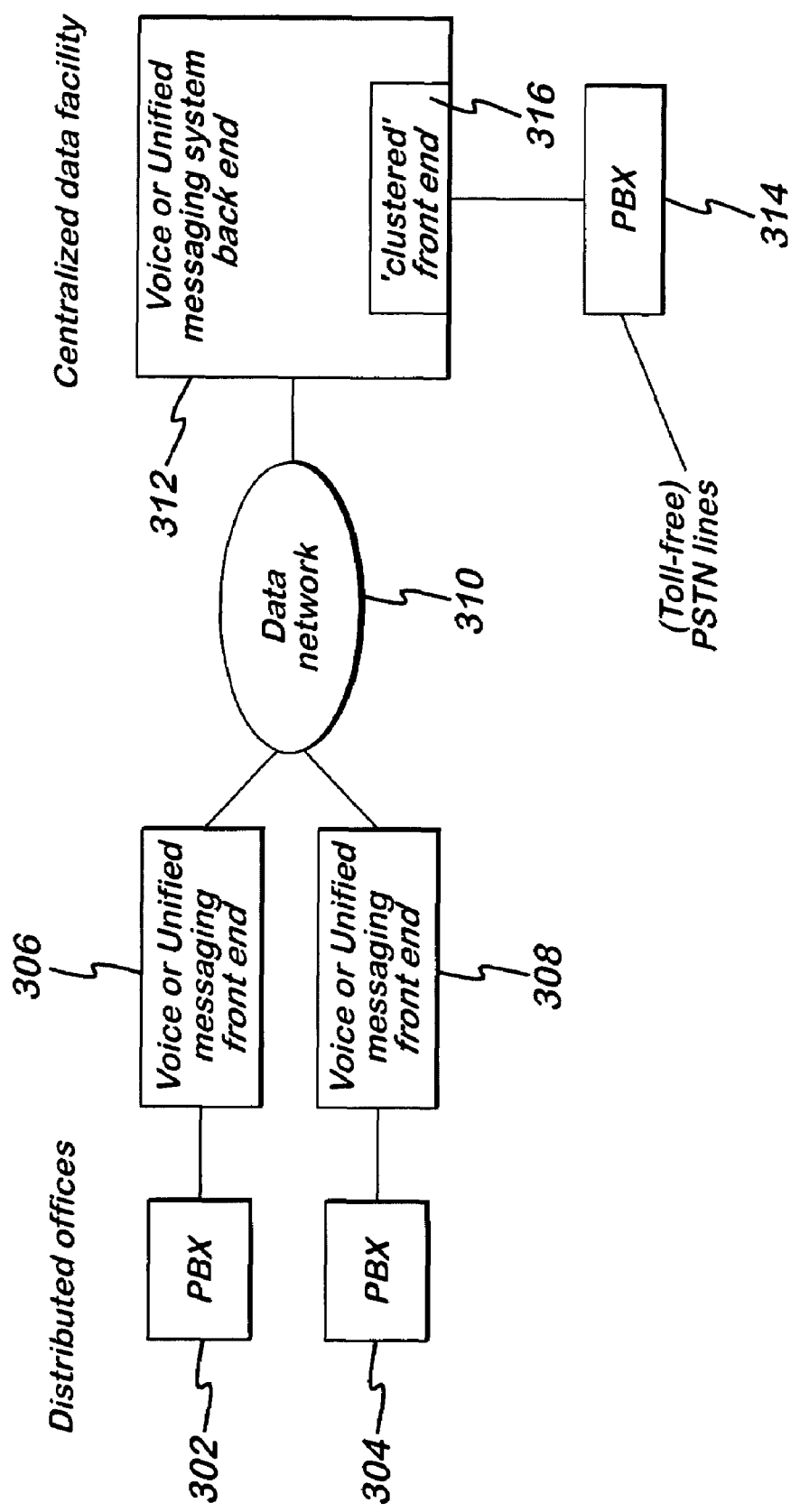
FIG. 3 illustrates an example of a voice or unified messaging system at which telephone switches and messaging systems are deployed at multiple locations together with an enhanced central messaging system in accordance with an embodiment of the present invention.

Referring to FIG. 3 there is shown a unified/voice messaging system deployed in a geographically distributed manner and implemented in accordance with a preferred embodiment of the present invention.

At a first distributed or remote location there is provided a PBX 302, connected to an associated voice or unified messaging front-end 306. At a second distributed or remote location there is provided a PBX 304, connected to an associated voice or unified messaging front-end 308. Each of the voice or unified messaging front-ends 306 or 308 may be considered to be remote or distributed voice or unified messaging systems. Each of the remote voice or unified messaging systems 306 or 308 is connected to a data network 310, through which there is provided a connection to a common, centralized voice or unified messaging system back-end 312. The voice or unified messaging system back-end 312 may be considered to be a centralized voice or unified messaging system, or a centralized data facility. The centralized voice or unified messaging system 312 is, in the described embodiment, further provided with a 'clustered' front end, which provides, as will be described further hereinbelow, front-end functionality equivalent to the functionality provided by the front-end voice or unified messaging system 306 and 308. The 'clustered' front end is connected to a PBX 314.

The voice or unified messaging front-end 306 effectively defines a first voice mail domain VMD#1. All users associated with the PBX 302 belong to VMD#1. As is discussed further hereinbelow, certain of the voice or unified messaging functionality for VMD#1 is also provided centrally by the voice or unified messaging back-end 312. As such, the voice or unified messaging back-end 312 forms part of VMD#1.

The voice or unified messaging front-end 308 effectively defines a second voice mail domain VMD#2. All users associated with the PBX 304 belong to VMD#2. As is discussed further hereinbelow, certain of the voice or unified messaging functionality for VMD#2 is also provided centrally by the voice or unified messaging back-end 312. As such, the voice or unified messaging back-end 312 forms part of VMD#2.

In the preferred embodiment of the present invention there is further defined a third voice mail domain VMD#3. All users associated with PBX 314 belong to VMD#3. All of the voice or unified messaging functionality for VMD#3 is provided centrally by the voice or unified messaging back-end 312 and clustered front-end 316.

Thus, in the embodiment of FIG. 3, users associated with remote PBX 302 are part of VMD#1, users associated with remote PBX 304 are part of VMD#2, and users associated with PBX 314 are part of VMD#3. Further remote locations may exist defining further voice mail domains, and individual voice mail domains may comprise multiple voice or unified messaging systems.

The functionality of the architecture of the system of FIG. 3 in accordance with the preferred embodiment of the invention is now further described.

The front-end voice/unified messaging functionality of the voice or unified messaging front-ends 306 and 308 provide certain voice/unified messaging functions local to the respective PBX 302 and 304 for the respective voice mail domains independent of access to the centralized voice/unified messaging system back-end 312. The clustered front-end 316 provides certain voice/unified messaging functions for users of VMD#3. The back-end 312 provides certain voice/unified messaging functionality for all voice mail domains.

It should be noted that although the embodiment specifically discloses the provision of PBXs at remote locations, more generally the remote locations can be considered to be provided with a switching capability, or telecommunications switch. The invention is not limited to PBX implementations.

The front-end or remote system functionality may include, for example, call answering and automated attendant functionality. These front-end or remote systems may also provide subscriber access capability. However the implementation of subscriber access may depend on the data networking characteristics, i.e. quality of service (QoS) of the connection from the front-end to the back-end.

Figure 4:
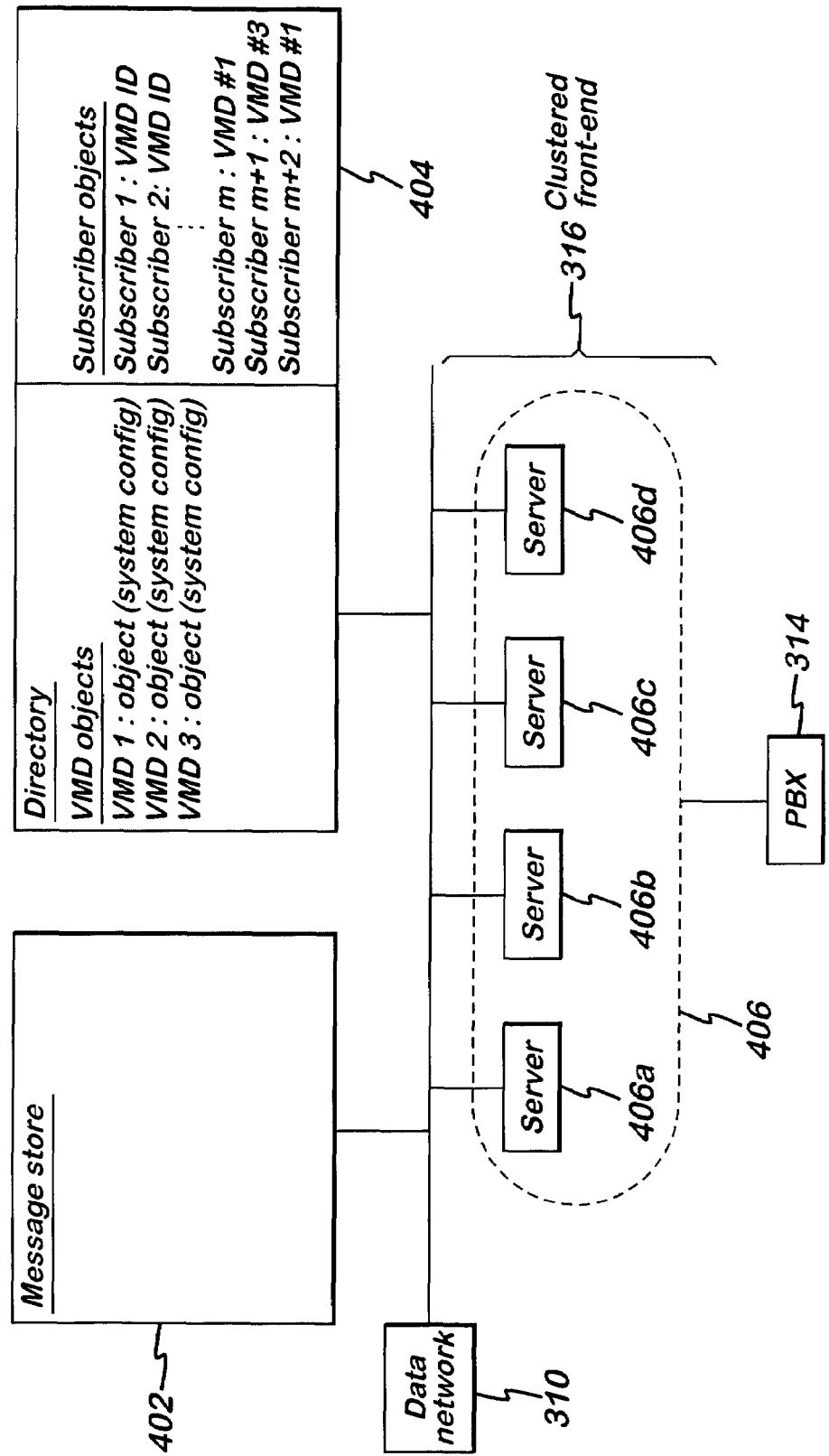
FIG. 4 illustrates an example implementation of the enhanced central messaging system of the embodiment of FIG. 3.

The implementation of the centralized data facility or voice/unified messaging system back-end system or central system of FIG. 3 in accordance with an example embodiment of the invention is shown in FIG. 4.

Referring to FIG. 4, in a preferred embodiment the voice or unified messaging system back-end 312 comprises a message store 402, a directory 404, and a plurality of servers 406.

In FIG. 4 there is shown four front-end servers 406*a* to 406*d*. The number of servers 406 is implementation dependent, and depends upon the overall capacity of the system needed to be supported. Additional servers may be provided to allow for redundancy to improve system reliability. The servers provide access to the voice or unified messaging system functionality for VMD#3, accessing the system via PBX 314.

For providing centralized voice or unified messaging functionality, the centralized voice or unified messaging system is configured for all voice mail domains. As shown in FIG. 4 the centralized voice or unified messaging system is provided with a message store 402 and a directory 404. The message store 402 stores messages, such as voice mails and e-mails, associated with system users for all voice mail domains. The directory 404 stores descriptive attributes associated with those system users, and system configuration data. As shown in FIG. 4, the directory 404 stores VMD objects defining system configuration data for each voice mail domain. The directory 404 additionally stores subscriber objects, defining the voice mail domain for each of the system subscribers.

As shown in FIG. 4, there is provided a central group of servers 406 in the centralized system. The servers provide access to the voice or unified messaging system functionality.

Figure 5:
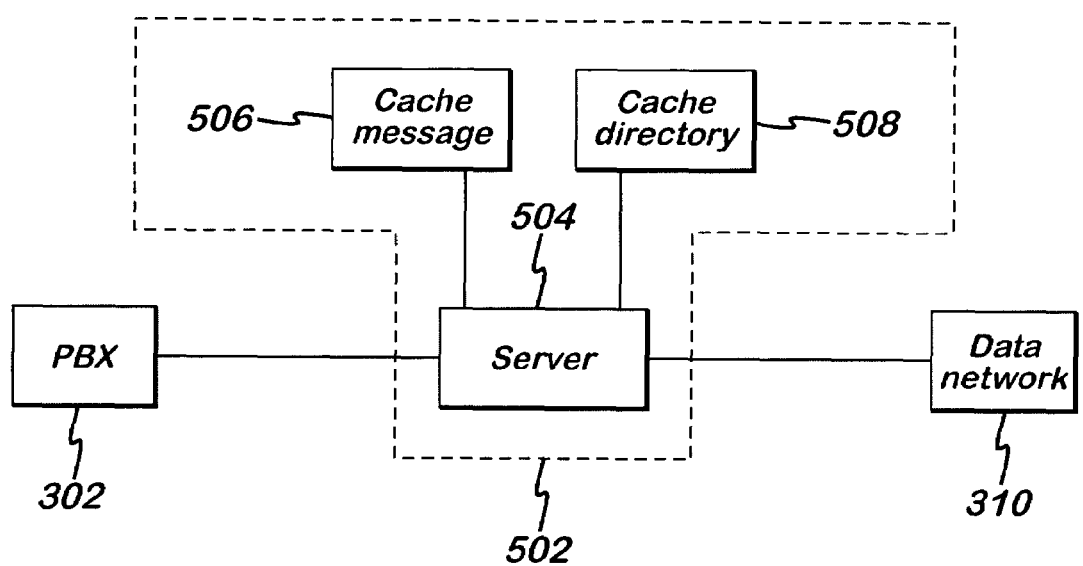
FIG. 5 illustrates an example implementation of a messaging system deployed at a location in accordance with the embodiment of FIG. 3.

The implementation of the distributed voice/unified messaging system front-end or remote system of FIG. 3 in accordance with an example embodiment of the invention is shown in FIG. 5.

Each PBX, such as PBX 302, is associated with a remote voice server 504, which may also be considered to be a remote front-end voice server. As can be seen, the remote voice server 504 is connected to the data network 310. The remote voice server 504 is associated with a cache message store 506 and a cache directory store 508, illustrated in FIG. 5. In accordance with a preferred embodiment of the present invention, and as discussed further hereinbelow, information associated with the users connected to the PBX 302, and stored in the corresponding message store 402 and directory store 404 of FIG. 4, are copied to the caches 506 and 508 of FIG. 5, such that a local copy of such information is available. As will be further discussed hereinbelow, remote voice or unified messaging functionality is provided by the front-end voice server 504 and caches 506 and 508, generally designated by reference numeral 502 and considered to be the voice or unified messaging front-end. It should be further noted that each PBX may be associated with more than one front-end voice server 504.

The invention provides, in a first embodiment, mechanisms to allow call answering and automated attendant functionality to operate when supported by low-guarantee network connectivity from the messaging system back-end. This is achieved by providing the necessary functionality at the front end. As such the provision of the functionality is not dependent upon any permanently available back-end or central connectivity. This is achieved by providing the necessary data, logic and control parameters to achieve such functionality in the caches. The back-end or central systems provide the primary message storage and directory storage and configuration data. All data, messages, user properties and system configuration information is primarily stored at the back-end or central system.

The invention provides in a second embodiment a mechanism for reliable subscriber access through direct connectivity to a large 'clustered' back-end system, in the centralized data storage facility, as provided for in FIG. 4.

In the following description, the invention is considered in two parts, although it should be understood that much of the functionality is shared. The invention is also described by way of reference to examples of specific feature implementations, but is not limited to such.

In a first embodiment, there is described in accordance with a preferred implementation of the invention the implementation of a call answering function and an automated attendant function supported remotely from the distributed centralized data facility, via a low QOS data network, as illustrated in FIGS. 4 and 5. This relates, more generally, to a description of those functions which can be provided independent of access to the back-end.

Call answering is a relatively simple process with only limited requirement for access to user and system data. The call answering process requires access to data of the following classes:

I. System properties, including system configuration data such as language availability; and
II. User properties, such as user configuration data such as 'find-me' rules and user status (e.g. extended absence), as well as associated audio greetings.

The front-end systems associated with each PBX need to maintain a cached copy of this data to allow a high degree of quality and reliability in the call answering process regardless of the connectivity to the back-end.

Preferably a cache management process operates in the background (at a pre-defined time interval, e.g. 5 minutes) and creates a local (and persisted) cache of both system and user properties from the back-end primary stores. As shown in FIG. 4, the directory includes voice mail domain (VMD) objects and subscriber objects. For VMD objects the system configuration parameters for each voice mail domain are defined. For subscriber objects the VMD identity for each subscriber is defined. This information is cached at the remote system. The cache management is preferably provided by the front-end or remote system. A time-stamp is preferably stored for user greetings in the message store. Before an audio greeting is played, the front-end system may check the time of last-update on the back-end primary version of the greeting. If the front-end cached version of a greeting is correct, then it is used. Otherwise a copy may be fetched from the back-end. In general, call answering results in recording an audio message. This can be submitted for delivery in the background with little real-time network capability.

Automated attendant, when supported by a cache of user and system properties as shown in FIG. 5, can also work in the local front-end system.

It is also possible to 'dynamically cache' information to reduce the effects of network latency and 'smooth-off' bursts of high network bandwidth requirements. As an example, the n+1th message can be pre-fetched when the nth message is played. This serves, to a point, to provide improved operation on poor networks but cannot cover all real-world network (e.g. total WAN failure) conditions.

Subscribers of VMD#3 access voice or unified messaging functionality in a conventional manner, all functionality being provided by the primary data stored in the centralized voice or unified messaging system back-end 312.

As discussed above, voice messaging or unified messaging functionality in VMD#1 and VMD#2 is preferably provided by the localized cached information. Where functionality requires direct centralized access, this can be provided by access to the centralized data facility via the data network. Such access may be required for certain subscriber access functions.

Figure 1:
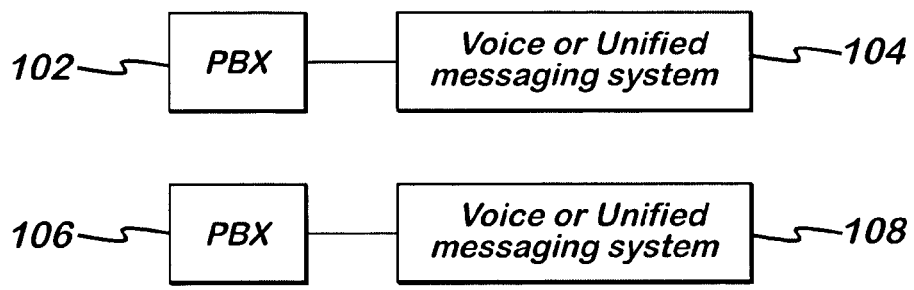
FIG. 1 illustrates an example of a voice or unified messaging system at which telephone switches and messaging systems are deployed at multiple locations, as known in the art.
Figure 2:
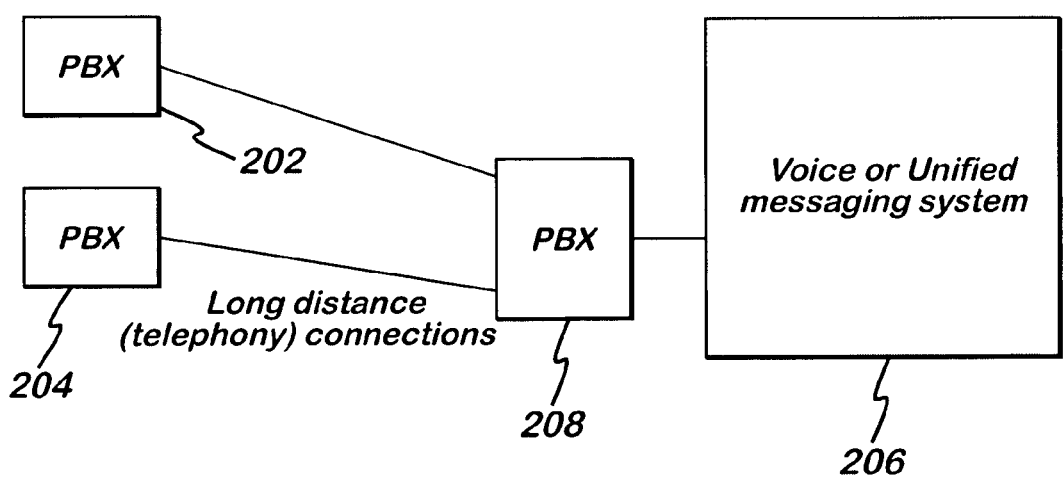
FIG. 2 illustrates an example of a voice or unified messaging system at which telephone switches are deployed at multiple locations and associated with a central messaging system, as known in the art.

In a second embodiment, there is described in accordance with a preferred embodiment of the invention the implementation of a subscriber access function for all voice mail domains supported at a shared centralized front-end system, as illustrated in FIG. 4, whilst exhibiting the same user characteristics as if calling a local system in the arrangement of FIG. 1. The advantage of such an arrangement is that subscriber access functions may be provided if the link for the remote systems to the centralized data facility is not available.

In the preferred embodiment, all subscribers of all voice mail domains may call into PBX 314, which may have a toll-free number associated therewith, for subscriber access functions. The system of FIG. 3 may be an enterprise system of a single organization, and the toll-free number may be an enterprise wide number for all voice mail domains within the enterprise.

Existing voice mail systems contain considerable system configuration data which defines the operation of the system. This information, in the Avaya Unified Messenger and MMA systems, is stored within a directory object called a voice mail domain object, in the directory of FIG. 4. In the preferred embodiments of the present invention, as discussed above, the front-end systems maintain a cache of this information, while the back-end systems manage the primary copy of the configuration data. In existing systems, and as mentioned hereinabove, multiple front-end systems can be part of a single voice mail domain.

However, critically, in order to provide centralized subscriber access, the front-end systems 316 co-located with the centralized data stores 312 need to be able to be part of multiple voice mail domains. A call coming into the clustered front-end 316 may be associated with any VMD, and there is therefore a need to handle the call appropriately for any VMD. The single (large) centralized system of FIG. 4 must be able to operate as part of all voice mail domains for which subscriber mailboxes are hosted. All voice mail domains are defined by directory objects stored in the directory systems within the back-end systems and as a consequence this configuration data is available to both local and centralized front-end systems. This access to the configuration data of all voice mail domains is provided by the network interface of FIG. 4, and stored locally in the caches of FIG. 5.

Subscribers calling into the large centralized front-end system (via the toll-free PBX access) must be identified. This identification can be based, for example, on various options:

a) Identification of the called number. This works if the subscribers of each voice mail domain are given a different number to call (possibly an 800 'toll-free' number). In such case their locally-valid mailbox number is enough to identify the subscribers as their voice mail domain can be known. The centralized voice servers may therefore include a look-up table matching dialed numbers to voice mail domains.

b) By logging into the system using an enterprise/organization wide numeric address, and not their usual mailbox/extension number (which is only valid in conjunction with their voice mail domain). This address allows the user to be identified, from which a VMD can be identified.

c) By identifying and recognizing the caller's number, for example the subscribers cell phone, home phone or work phone numbers may be stored in a look-up table.

The clustered or centralized voice servers 406 of FIG. 4 can be adapted to provide identification of the calling party as described above to interpret the call for the appropriate voice mail domain.

Once the voice mail domain (VMD) and the subscriber are identified the centralized front-end system of FIG. 4 needs to provide an interaction which is identical to that experienced by a subscriber calling into a local front-end system of FIG. 1. The front-end system 306 thus effectively shifts its modus operandi based on the voice mail domain information, i.e. the system operates as if it were the voice mail domain identified. All system parameter information is available and used to provide the required interface.

Once logged on, subscribers are presented with the correct addressing options. Addressing a message to a user by their mailbox/extension number must work correctly. A user within location 1 (e.g. voice mail domain VMD#1) addressing a message to "4003", needs to have this resolved to the 4003 mailbox (at location 1). A user from location 2 (e.g. voice mailbox domain VDM#2) may address to the same number and must have this resolved to a different mailbox. The provision of the clustered front-end 316 of FIG. 3 and FIG. 4 provides for sudh features to work corrrectly.

Certain voice/unified messaging scenarios result in the system launching outbound calls. To allow centralized systems to perform this correctly, telephone numbers must be stored in their canonical form. Both types of front-end systems (distributed and centralized) are preferably configured with rules to ensure calls are correctly dialed.

In summary, therefore, in embodiments the present invention provides for the provisions of distributed messaging system functionality and centralized messaging system functionality, in which the distributed functionality is provided by cached stores from the centralized system, and in which users of the distributed systems may access certain functionality through direct access to the centralized system.

The present invention is described herein with reference to particular examples. The invention is not limited in its applicability to the examples given. One skilled in the art will appreciate the general applicability of the present invention.

The invention claimed is:

1. A messaging system comprising a plurality of distributed front-end messaging systems and a centralized data store associated with said distributed front-end messaging systems, the distributed front-end messaging system being remotely located from one another and from the centralized data store, the centralized data store being adapted for communication with said distributed front-end messaging system over a network, the centralized data store including means for storing data associated with users of the distributed front-end messaging systems, the distributed front-end messaging systems further including respective means for storing respective different portions of the centralized data, the respective different portions being associated with respective subsets of the users of said distributed front-end messaging systems, such that at least one messaging function can be provided to a given one of the users of a given one of said distributed front-end messaging systems in dependence on the portion of the centralized data stored therein.

2. A messaging system according to claim 1 wherein each of the plurality of distributed front-end messaging systems is associated with a respective plurality of users and each includes a cache means, wherein the centralized data store is adapted to store data associated with all users of said front-end messaging systems.

3. A messaging system according to claim 1 wherein there is further provided a centralized front-end messaging system associated with said centralized data store.

4. A messaging system according to claim 3 wherein the centralized front-end messaging system is associated with a plurality of users, data associated with said users being stored in the centralized data store.

5. A messaging system according to claim 3 wherein the centralized front-end messaging system provides at least one messaging function for users of said at least one distributed front-end messaging system.

6. A messaging system according to claim 5 wherein the centralized front-end messaging system is adapted to identify the distributed front-end messaging system of a user.

7. A messaging system according to claim 6 wherein the centralized front-end messaging system is adapted to identify the front-end messaging system of a user in dependence on a called number, a calling number, or a unique user identifier.

8. A messaging system according to claim 5 wherein the centralized front-end messaging system provides access to all stored data associated with said at least one distributed front-end messaging system.

9. A messaging system according to claim 1 wherein the centralized data store stores configuration data and message data associated with all users.

10. A messaging system according to claim 1 wherein the at least one messaging function includes call answering.

11. A messaging system according to claim 5 wherein said at least one messaging function is a subscriber access function.

12. A messaging system according to claim 1 wherein each front-end messaging system is associated with a respective voice mail domain.

13. A messaging system of claim 1 wherein each front-end messaging system is associated with a telecommunications switch.

14. A method of configuring a messaging system, the messaging system comprising a plurality of distributed front-end messaging systems and a centralized data store associated with said distributed front-end messaging systems, the distributed front-end messaging systems being remotely located from one another and from the centralized data store, the centralized data store being adapted for communication with said distributed front-end messaging systems over a network, the method comprising: storing, in the centralized data store, data associated with users of the distributed front-end messaging systems; storing, in the distributed front-end messaging systems, respective different portions of said centralized data associated with respective subsets of the users of the distributed front-end messaging systems, and providing at least one messaging function to a given one of the users of a given one of the distributed front-end messaging systems in dependence on the corresponding portion of the centralized data stored in the given distributed front-end messaging system.

15. A method according to claim 14 wherein the step of storing respective different portions of said centralized data at in said distributed front-end messaging systems comprises caching the respective different portions of said centralized data in the distributed front-end messaging systems.

16. A method according to claim 14 further comprising providing at least one messaging function to users of the distributed front-end messaging systems in dependence on data stored in the centralized data store.

17. A method according to claim 16 further comprising the distributed front-end messaging systems accessing the centralized data store directly.

18. A centralized data store adapted for use in a messaging system comprising a plurality of distributed front-end messaging systems associated with the centralized data store, the distributed front-end messaging systems being remotely located from one another and from the centralized data store, the centralized data store being adapted for communication with said distributed front-end messaging systems over a network, the centralized data store including means for storing data associated with users of the distributed front-end messaging systems, the distributed front-end messaging systems further including respective means for storing respective different portions of the centralized data, the respective different portions being associated with respective subsets of the users of said distributed front-end messaging systems, such that at least one messaging function can be provided to a given one of the users of a given one of said distributed front-end messaging systems in dependence on the portion of the centralized data stored therein.

* * * * *

UNITED STATES PATENT AND TRADEMARK OFFICE
CERTIFICATE OF CORRECTION

PATENT NO. : 7,272,214 B2  Page 1 of 1
APPLICATION NO. : 10/657546
DATED : September 18, 2007
INVENTOR(S) : C. N. Didcock et al.

It is certified that error appears in the above-identified patent and that said Letters Patent is hereby corrected as shown below:

Col. 9, line 28, insert --406 of-- after the words 'FIG. 3 and'

Col. 9, line 29, delete "sudh" and insert --such--

In the claims:

Claim 1, col. 9, line 52, delete "system" and insert --systems--

Claim 7, col. 10, line 23, insert --distributed-- after the words 'identify the' and before the words 'front-end'

Claim 15, col. 10, line 65, delete "at"

Signed and Sealed this

Fifteenth Day of April, 2008

JON W. DUDAS
*Director of the United States Patent and Trademark Office*